United States Patent
Bauer et al.

(10) Patent No.: US 8,571,255 B2
(45) Date of Patent: Oct. 29, 2013

(54) SCALABLE MEDIA FINGERPRINT EXTRACTION

(75) Inventors: Claus Bauer, Beijing (CN); Regunathan Radhakrishnan, San Bruno, CA (US); Wenyu Jiang, Beijing (CN); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 229 days.

(21) Appl. No.: 13/142,355

(22) PCT Filed: Jan. 7, 2010

(86) PCT No.: PCT/US2010/020292
§ 371 (c)(1),
(2), (4) Date: Jun. 27, 2011

(87) PCT Pub. No.: WO2010/080857
PCT Pub. Date: Jul. 15, 2010

(65) Prior Publication Data
US 2011/0268315 A1 Nov. 3, 2011

Related U.S. Application Data

(60) Provisional application No. 61/143,139, filed on Jan. 7, 2009.

(51) Int. Cl.
*G06K 9/00* (2006.01)

(52) U.S. Cl.
USPC ........................................... 382/100

(58) Field of Classification Search
None
See application file for complete search history.

(56) References Cited

U.S. PATENT DOCUMENTS

| | | | |
|---|---|---|---|
| 2001/0028731 A1* | 10/2001 | Covell et al. | 382/118 |
| 2003/0202680 A1* | 10/2003 | Hayashi | 382/100 |
| 2005/0285788 A1* | 12/2005 | Xin | 342/432 |
| 2009/0063277 A1 | 3/2009 | Bernosky et al. | |
| 2009/0293119 A1* | 11/2009 | Jonsson | 726/19 |
| 2009/0304082 A1 | 12/2009 | Radhakrishnan et al. | |
| 2010/0067701 A1* | 3/2010 | Patwari et al. | 380/279 |
| 2010/0150520 A1 | 6/2010 | Hopwood et al. | |
| 2010/0238350 A1 | 9/2010 | Radhakrishnan et al. | |
| 2011/0022633 A1 | 1/2011 | Bernosky et al. | |
| 2011/0035382 A1 | 2/2011 | Bauer et al. | |
| 2011/0096955 A1* | 4/2011 | Voloshynovskiy et al. | 382/103 |
| 2011/0142348 A1 | 6/2011 | Radhakrishnan et al. | |

(Continued)

FOREIGN PATENT DOCUMENTS

| | | |
|---|---|---|
| WO | 2009/005602 | 1/2009 |
| WO | 2009/046438 | 4/2009 |
| WO | 2010/022303 | 2/2010 |

OTHER PUBLICATIONS

S.S.Kozat, R. Venkatesan and M.K.Mihcak, "Robust perceptual image hashing via matrix invariants," Proc. of ICIP, 2004.*

(Continued)

*Primary Examiner* — Stephen R Koziol
*Assistant Examiner* — Sean Conner

(57) ABSTRACT

Derivation of a fingerprint includes generating feature matrices based on one or more training images, generating projection matrices based on the feature matrices in a training process, and deriving a fingerprint for one or more images by, at least in part, projecting a feature matrix based on the one or more images onto the projection matrices generated in the training process.

14 Claims, 5 Drawing Sheets

(56) References Cited

U.S. PATENT DOCUMENTS

2011/0194737 A1* 8/2011 Sharma et al. ............... 382/112
2012/0313809 A1* 12/2012 Testar et al. .................. 342/118
2013/0028516 A1* 1/2013 Warfield et al. .............. 382/173

OTHER PUBLICATIONS

Fridrich, et al., "Robust Hash Functions for Digital Watermarking" ITCC, 2000.

Radhakrishnan, et al., "Video Fingerprinting Based on Moment Invariants Capturing Appearance and Motion" IEEE, 2009, pp. 1532-1535.

Radhakrishnan, et al., "On Improving the Collision Property of Robust Hashing Based on Projections" Multimedia and Expo, 2009, ICME 2009 Jun. 28, 2009, pp. 862-865.

Radhakrishnan, et al., "On Deriving Longer Fingerprints From Features Based on Projections" Proceedings ICME 2010, IEEE, Jan. 1, 2010, pp. 1359-1363.

Radhakrishnan, et al., "A Review of Video Fingerprints Invariant to Geometric Attacks" Proceedings of International Society for Optical Engineering, Jan. 19, 2009, vol. 7254.

Radhakrishnan, et al., "Content-based Video Signatures Based on Projections of Difference Images" Multimedia Signal Processing, 2007, IEEE 9th Workshop on IEEE Piscataway, NJ, USA. Oct. 1, 2007, pp. 341-344.

Radhakrishnan, et al., "Robust Video Fingerprints Based on Subspace Embedding" Acoustics, Speech and Signal Processing, 2008. IEEE International Conference on IEEE, Piscataway, NJ, USA, Mar. 31, 2008, pp. 2245-2248.

Balado, Felix, "An Introduction to the Principles and Requirements of Robust Hashing" Intelligent Multimedia Analysis for Security Applications, Jan. 1, 2009, pp. 237-252.

Lian, et al., "Content-Based Video Copy Detection-A Survey" Intelligent Multimedia Analysis for Security Applications, Springer 2010, pp. 253-273.

Radhakrishnan, et al., "Multimedia Analysis for Content Identification" Multimedia Content Analysis, Signals and Communication Technology, Jan. 1, 2009.

Theodoridis, S., et al., "Pattern Recognition" Jan. 1, 1999, Academic Press, pp. 157-159.

Feng, et al., "Biometric Template Protection: Towards a Secure Biometric System" Handbook of Pattern Recognition and Computer Vision, 4th Ed., World Scientific, Jan. 1, 2009, pp. 455-476.

Teoh, A., et al., "Random Multispace Quantization as an Analytic Mechanism for BioHashing of Biometric and Random Identity Inputs" IEEE Transactions on Pattern Analysis and Machine Intelligence, IEEE Service Center, vol. 27, No. 12, Dec. 1, 2006, pp. 1892-1901.

* cited by examiner

SCALABLE MEDIA FINGERPRINT EXTRACTION

CROSS-REFERENCE TO RELATED APPLICATIONS

This application claims priority to U.S. Provisional Patent Application No. 61/143,139, filed 7 Jan. 2009, which is hereby incorporated by reference in its entirety for all purposes.

TECHNOLOGY

The present invention relates generally to image signatures. More specifically, embodiments of the present invention relate to scalable media fingerprint extraction.

BACKGROUND

Media clips or media content are segments of audio media, video media, or audio/visual (AV) media and include information that is embodied, stored, transmitted, received, processed, or otherwise used with at least one medium. Common media clip formats include FLV format (flash video), Windows Media Video, RealMedia, Quicktime, MPEG, MP3, and DivX. As used herein, the terms "media clips", "media content," "information content," and "content" may be used interchangeably.

Media clips may be defined with one or more images. For example, video media may be a combination of a set of temporally related frames or images at particular points in time of the video media. Additionally, audio media may be represented as one or more images using many different techniques known in the art. For example, audio information may be captured in a spectrogram. In the spectrogram, the horizontal axis can represent time, the vertical axis can represent frequency, and the amplitude of a particular frequency at a particular time can be represented in a third dimension. Further, in a two dimensional spectrogram, the amplitude may be represented with thicker lines, more intense colors or grey values. Those skilled in the art will appreciate that many different modifications to the above example and other representations may be used to represent an audio clip as an image.

Images that define media content (audio and/or video) may be associated with a corresponding fingerprint ("fingerprint" used interchangeably with and equivalent to "signature"). Some fingerprints of media content may be derived (e.g., extracted, generated) from information within, or which comprises a part of the media content. A media fingerprint embodies or captures an essence of the media content of the corresponding media and may be uniquely identified therewith. Video fingerprints are media fingerprints that may be derived from images or frames of a video clip. Audio fingerprints are media fingerprints that may be derived from images with embedded audio information (e.g., spectrograms). Further, the term media fingerprint may refer to a low bit rate representation of the media content with which they are associated and from which they are derived.

Most applications of content identification using media fingerprints rely on a large database of media fingerprints. Any query fingerprint that is extracted from query media is compared against this database of media fingerprints to identify matches. As the size of database increases in terms of number of hours of media, it is desirable that the uniqueness of fingerprint codewords is not reduced. A fingerprint codeword generally represents a sequence of fingerprint bits that is used for indexing (e.g., in a hash table) the media fingerprints. The fewer number of fingerprints/media files that correspond to a fingerprint codeword, the more unique the fingerprint codeword is. This uniqueness property of the fingerprint codewords allows for scaling of the fingerprint database to a large number of hours. However, if certain fingerprint codewords are more likely to occur than others, then as the database size grows the uniqueness reduces since the more likely fingerprint codewords will each link to a large number of fingerprints/media files. The large number of fingerprints/media files corresponding to fingerprint codewords results in more computations to perform content identification. For example, in a hash-table based searching method a fingerprint codeword of a query fingerprint may be used to identify all fingerprints/media files in a fingerprint database that are linked to the same fingerprint codeword. Multiple fingerprints/media files being linked to the same fingerprint codeword is referred to as collisions. The larger the number of collisions (i.e., fingerprints/media files) for the same fingerprint codeword, the greater the computations required to determine which one of the fingerprints/media files corresponding to the fingerprint codeword are equivalent or the best match to the query fingerprint. The fewer the number of collisions (i.e., fingerprints/media files) for the same fingerprint codeword, the lesser the computations required to determine which one of the fingerprints/media files corresponding to the fingerprint codeword are equivalent or the best match to the query fingerprint. Thus, the fingerprints that have a small number of average collisions per fingerprint codeword will result in shorter search duration. Such fingerprints are scalable for searching through a larger database of fingerprints than fingerprints for which the average number of collisions is higher.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
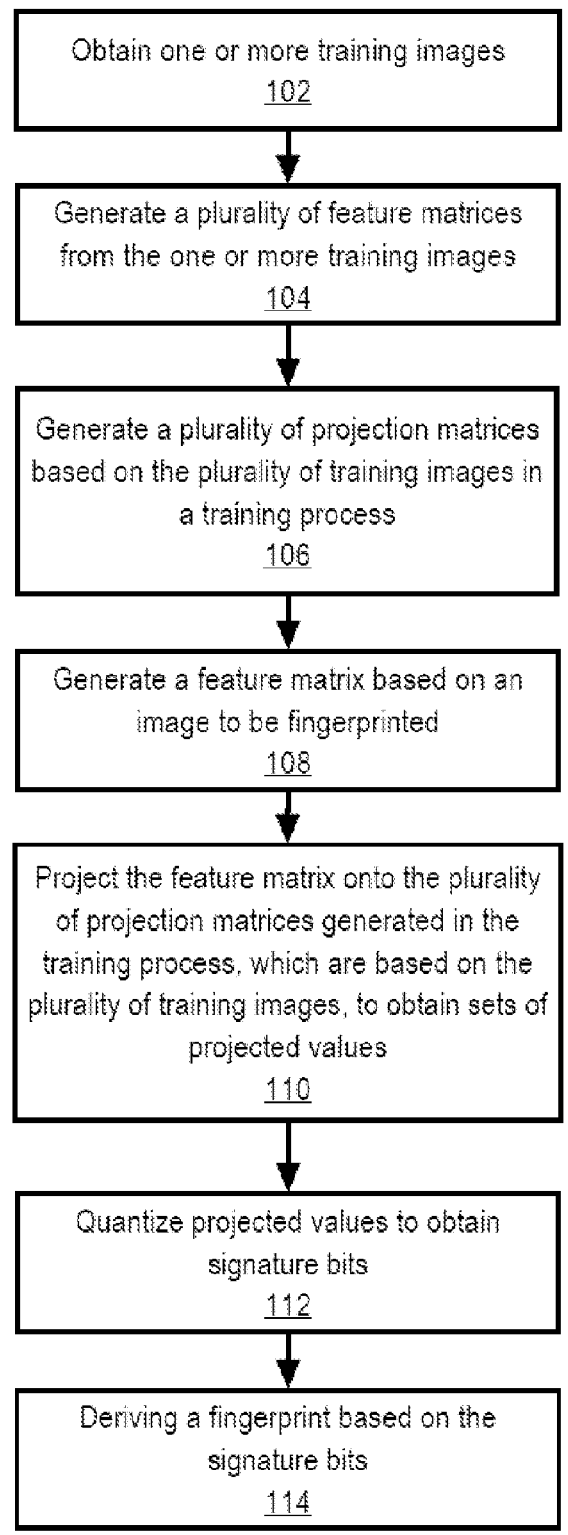
FIG. 1 depicts an example procedure for generation of a fingerprint or fingerprint codewords for an image using projection matrices based on a training set, according to an embodiment of the present invention.

The example embodiments described herein relate to deriving (e.g., extracting, generating, determining, computing) signatures for images using projection matrices that are created based on a training set of images. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Example embodiments are described herein according to the following outline:

1.0 General Overview
2.0 Functional Overview
   2.1 Derivation of a Media Fingerprint using Projection Matrices based on a Training Set of Images
   2.2 Generation of Projection Matrices using Projected Values of a Training Set of Images
   2.3 Generation of Projection Matrices using Matrix Factorization
3.0 Implementation Mechanisms—Hardware Overview
4.0 Equivalents, Extensions, Alternatives, and Miscellaneous

1.0 GENERAL OVERVIEW

In an embodiment, a plurality of feature matrices are generated in a training process based on one or more training images. A plurality of projection matrices are based on the plurality of feature matrices. Thereafter, a fingerprint codeword is derived for one or more images, where deriving the fingerprint codeword for the one or more images includes projecting a feature matrix based on the one or more images onto the plurality of projection matrices.

Generating the plurality of projection matrices based on the plurality of feature matrices may include projecting the plurality of feature matrices onto a plurality of candidate matrices to obtain a plurality of projected values for each of the plurality of candidate matrices, and selecting a subgroup of projection matrices from the plurality of candidate matrices based on cross-correlation values between the plurality of projected values for each of the projection matrices.

Selecting the projection matrices may be responsive to determining that the cross-correlation values between the plurality of projected values for each of the projection matrices are below a cross-correlation threshold value.

Projecting the plurality of feature matrices onto the plurality of candidate matrices to obtain a plurality of projected values for each of the plurality of candidate matrices, may include iteratively generating the plurality of candidate matrices until selection of the projection matrices is completed.

Iteratively generating the plurality of candidate matrices until selection of the projection matrices is completed may include: determining a cross-correlation between the projected values of a current set of the plurality of candidate matrices, replacing at least one candidate matrix in the current set of the plurality of candidate matrices with one or more new candidate matrices in each iteration, until the current set of plurality of candidate matrices is identified such that the cross-correlation values between the projected values for each of the current set of the candidate matrices, which are obtained by projection of the plurality of feature matrices onto the current set of the candidate matrices, are all below the cross-correlation threshold value, and selecting the current set of the plurality of candidate matrices as the projection matrices when the cross-correlation values between the projected values for each of the current set of the candidate matrices are all below the cross-correlation threshold value.

Iteratively generating the plurality of candidate matrices until selection of the projection matrices is completed may include: projecting the plurality of feature matrices onto a first candidate matrix of the plurality of candidate matrices to obtain a first plurality of projected values for the first candidate matrix, determining cross-correlation values between the first plurality of projected values and the projected values of the remaining candidate matrices that have previously been generated, where at least one cross-correlation value is above the cross-correlation threshold, responsive to the at least one-correlation value being above the cross-correlation threshold, generating a second candidate matrix of the plurality of candidate matrices, projecting the plurality of feature matrices onto the second candidate matrix of the plurality of candidate matrices to obtain a second plurality of projected values for the second candidate matrix, determining cross-correlation values between the second plurality of projected values and the projected values of the remaining candidate matrices that have previously been generated, except the first plurality of projected values, where the cross-correlation values between the second plurality of projected values and the projected values of the remaining candidate matrices are below the cross-correlation threshold, and responsive to determining cross-correlation values, between the second plurality of projected values and the projected values of the remaining candidate matrices, that are below the cross-correlation threshold, selecting the second candidate matrix as one of the projection matrices.

In an embodiment, the second candidate matrix may be generated based on the first candidate matrix.

Generating the second candidate matrix based on the first candidate matrix may include generating the second candidate matrix orthogonal to the first candidate matrix.

Selecting the projection matrices based on a cross-correlation between the projected values for each of projection matrices, may include: generating a cross-correlation matrix comprising a plurality of cross-correlation values for each candidate matrix, where the plurality of cross-correlation values for a candidate matrix represent cross-correlation between said candidate matrix and the remaining candidate matrices of the plurality of candidate matrices, and selecting said candidate matrix as a projection matrix of the plurality of projection matrices if each of the plurality of cross-correlation values for said candidate matrix are below the cross-correlation threshold.

Projecting the plurality of feature matrices onto one the plurality of candidate matrices to obtain a plurality of projected values for each of the plurality of candidate matrices, may include: computing a hadamard product of the plurality of feature matrices and the plurality of candidate matrices.

Selecting a subgroup of projection matrices from the plurality of candidate matrices may be further based on selecting projection matrices where the projected values of the projection matrices threshold to zero and one, evenly.

Deriving a fingerprint codeword for the one or more images further may include: projecting the feature matrix based on the one or more images onto the projection matrices to generate a plurality of projected values associated with the one or more images, computing a plurality of signature bits based on the plurality of projected values, and determining the fingerprint codeword for the one or more images based on the plurality of signature bits.

Computing the plurality of signature bits based on the plurality of projected values may include deriving a varying number of signature bits based on each of the projection matrices of the plurality of projected values based on a uniqueness of each projection matrix, where the uniqueness of a projection matrix is determined by: projecting the plurality of feature matrices, which are based on the one or more training images, on the projection matrix to obtain a corresponding set of projected values, comparing the set of projected values corresponding to the projection matrix to each set of projected values corresponding to the remaining projection matrices of the plurality of projection matrices to determine cross-correlation values for the projection matrix, and ranking the uniqueness of the projection matrix based on an inverse relationship to the cross-correlation values for the projection matrix.

In an embodiment, the one or more images may be spectrograms, video frames, or still images.

In an embodiment, generating the plurality of projection matrices based on the plurality of feature matrices includes computing a basis representation of the feature matrices, and generating the plurality of projection matrices based on the basis representation.

The basis representation may be derived using any matrix factorization step based on the plurality of feature matrices. For example, the matrix factorization step may include non-negative matrix factorization (NMF) step or singular value decomposition (SVD) applied to the plurality of feature matrices. The matrix factorization step may also include applying SVD or principal component analysis (PCA) to a covariance matrix of the plurality of feature matrices.

The basis representation may include a plurality of basis vectors and a linear combination of the plurality of basis vectors from which the plurality of feature matrices or a covariance matrix of the plurality of feature matrices may be computed. The plurality of basis vectors of the basis representation may be used as the projection matrices.

In an embodiment, deriving a fingerprint codeword for an image may include deriving a varying number of signature bits based on each of the projection matrices and generating the fingerprint codeword based on the signature bits. For example, more signature bits may be derived from the projected value of a basis vector which is more significant than other basis vectors. Significance of a particular basis vector can be determined by how much contribution that basis vector has towards representing a feature matrix. In case of SVD, the significance of a basis vector is indicated by how large the corresponding singular value is. Further, in the case of SVD, the earlier in sequence of derivation, the basis vector is derived, the more significant it is.

In an embodiment, a cross-correlation value, between projected values obtained by projecting the plurality of feature matrices onto the projection matrices, is zero.

Other embodiments of the invention may include a system and computer readable medium with functionality to execute the steps described above.

2.0 FUNCTIONAL OVERVIEW

Examples of embodiments, which relate to generating media fingerprints that correspond to media content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Media fingerprints may be described herein with reference to one or more example media, including video and/or audio media. The selection of an example medium in this description may be made for simplicity and concise unity and, unless expressly stated to the contrary, should not be construed as limiting an embodiment to a particular medium as embodiments of the present invention are well suited to function with audio and/or video media. Furthermore, embodiments of the present invention are well suited to function with images, corresponding to media content, which may represent two or three spatial dimensions.

2.1 Derivation of a Media Fingerprint Using Projection Matrices Based on a Training Set of Images As depicted in FIG. 1, in order to derive a media fingerprint from media content, one or more training images are first obtained (Step 102). The training images generally correspond to any set of images randomly generated and/or specifically selected. The training images may be based on audio and/or video media. Obtaining training images may involve selecting images that are different in color, shapes, intensity, or any other features. A training image may also be generated by concatenating multiple images. In an embodiment, the same set of training images may be used to generate generic projection matrices (described below) that are used for creation of fingerprint codewords for all images. In another embodiment, different sets of training images may be used to generate projection matrices that are specific to a type of image. For example, a set of spectrograms may be used as training images to generate projection matrices, which are used to create fingerprints specifically for spectrograms. Another example may involve the use of images from a cartoon series as training images to generate projection matrices, which are used to create fingerprints specifically for cartoons.

A plurality of feature matrices may be generated from the training image(s) (Step 104). A feature matrix generally represents a numerical representation of an image and may be based on any information that can be extracted from the image. For example, the feature matrix may be based on intensity, shapes, colors, ratios or differences (e.g. for intensities) between one section of an image and another section of the image.

A plurality of projection matrices are generated in a training process based on the plurality of training images (Step 106). Although generation of the plurality of projection matrices may involve any training process which relies on a plurality of training images, two exemplary training processes for identifying a set of projection matrices, are further described below in relation to FIG. 2 and FIG. 3. Once the projection matrices have been generated they may be used to create fingerprints or fingerprint codewords for any image.

In an embodiment, a feature matrix is generated based on an image that is to be fingerprinted (Step 108). Examples of images include, but are not limited to, still images, images based on audio media (e.g., spectrogram), or images based on video media (e.g., a video frame). The feature matrix of the image is then projected onto each of the plurality of projection matrices, which are generated based on the training images (Step 110). Projecting the feature matrix onto a projection matrix may involve any computation that takes in as input the feature matrix as well as the projection matrix. For example, one method of projecting the feature matrix onto the projection matrix involves taking the hadamard product of the feature matrix and the projection matrix and thereafter, summing all the elements in the resulting matrix to obtain a projected value. Accordingly, projecting the feature matrix onto a plurality of projection matrices results in a plurality of projected values each corresponding to a projection matrix.

The projected values may then be quantized to derive complete fingerprints or fingerprint codewords for the image which index the complete fingerprints/media files (Step 112).

One example of quantizing projected values involves thresholding the projected values to obtain signature bits. Thresholding a projected value includes comparing the projected value to a threshold value and assigning a signature bit based on whether the projected value is larger than or smaller than the threshold value. The threshold value may simply be a constant or may be selected so that the signature bits are evenly distributed. For example, the threshold value may be the median or average of the projected values.

In an embodiment, a fingerprint or fingerprint codeword is derived from the signature bits (Step 114). The fingerprint or fingerprint codeword may simply be concatenation of the signature bits or may otherwise use (e.g., rearrange, omit, etc.) the signature bits to generate the fingerprint or the fingerprint codeword.

Figure 2:
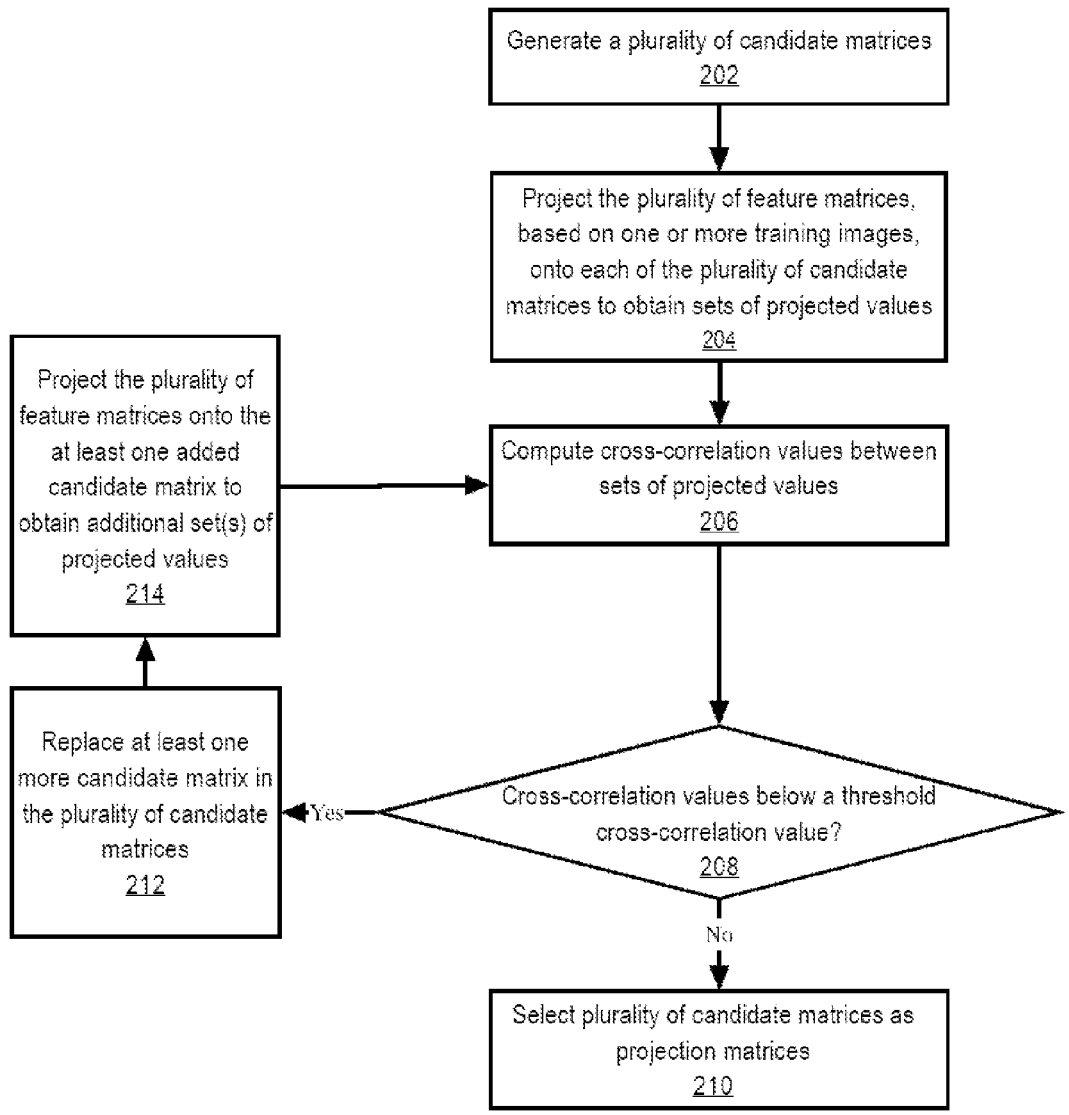
FIG. 2 and FIG. 3 depict example procedures for generation of projection matrices.

2.2 Generation of Projection Matrices Using the Projected Values of a Training Set of Images FIG. 2 depicts a training process involving an iterative method for generating projection matrices using cross-correlation values. The iterative method starts with a set of candidate matrices and replaces at least one candidate matrix every iteration until a suitable set of projection matrices is identified. In the iterative procedure, a first set of N candidate matrices $P_{1,j}, P_{2,j}, \ldots P_{N,j}$ is initially generated for the first iteration j=1 (Step 202). The N candidate matrices may simply be randomly generated matrices that are generated without any relation to one another. The N candidate matrices may also be generated based on an algorithm using input. For example, each candidate matrix may be generated using a random number generator that relies on an input (e.g., current time) which may ensure that the candidate matrices are different. Another function may also be used that relies on the previously generated candidate matrices to generate a candidate matrix that is different or less correlated to the matrices generated previously. For example, each of the candidate matrices $P_{1,j}, P_{2,j}, \ldots P_{N,j}$ (j=1) may be generated consecutively where the second candidate matrix $P_{2,j}$ is based on the first candidate matrix $P_{1,j}$ to ensure that the second candidate matrix $P_{2,j}$ is different than the first candidate matrix $P_{1,j}$. Thereafter, the third candidate matrix $P_{3,j}$ may be generated by relying on the first candidate matrix $P_{1,j}$ and the second candidate matrix $P_{2,j}$ to ensure that the third candidate matrix $P_{3,j}$ is different than both the first candidate matrix $P_{1,j}$ and the second candidate matrix $P_{2,j}$.

The plurality of feature matrices (now referred to as $Q^i$, where i goes from 1 to M) based on one or more training images, as described above with relation to Step 104, are projected on to the candidate matrices $P_{1,j}, P_{2,j}, \ldots P_{N,j}$ (j=1) to obtain the projected values $H^i_{1,j}, H^i_{2,j}, H^i_{N,j}$ where each candidate matrix has a corresponding set of projected values from projection of the feature matrices onto that candidate matrix (Step 204). A projection of a feature matrix onto a candidate matrix generally represents any computation which involves both the feature matrix and the candidate matrix to obtain a projected value. For example, a feature matrix may be projected onto a candidate matrix by taking the hadamard product of the two matrices and adding the elements in the resulting matrix to obtain a projected value.

Next, the set of projected values corresponding to each candidate matrix is compared to the sets of projected values corresponding to the remaining candidate matrices to compute cross-correlation values (Step 206). Accordingly, cross-correlation values are computed for each combinational pair of candidate matrices based on their corresponding projected values from the training images. Cross-correlation values generally represent any values that represent the relationship between the different sets of projected values. In an embodiment, a cross-correlation matrix with all the cross-correlation values between the different sets of projected values is created where each row represents one of the candidate matrices and each column also represents one of the candidate matrices. Within the cross-correlation matrix where a row and column are associated with the same matrix, the cross-correlation value is 1 as the projected values that are being compared are the exact same (since they are the projected values corresponding to that candidate matrix). Furthermore, if the order of candidate matrices from top to bottom rows and left to right columns is the exact same, the candidate matrix will have a cross-correlation value of 1 across the diagonal from the top-left corner to the bottom-right corner as that will the interception point of the projected values from the same candidate matrix.

In an embodiment, the cross-correlation values may be calculated using Equation (1) shown below:

$$C^j(k,l) = \frac{\frac{1}{M}\sum_{i=1}^{M}(H^i_{k,j} - E(H_{k,j}))(H^i_{l,j} - E(H_{l,j}))}{\sqrt{\sigma_{k,j}}\sqrt{\sigma_{l,j}}} \quad (1)$$

$$k = 1, 2, \ldots N; l = 1, 2, \ldots N$$

In this equation, $C^j(k,l)$ is the cross-correlation value between the projected values $H_{k,j}$ and $H_{l,j}$ for $j^{th}$ iteration. M represents the number of feature matrices that are created based on the one or more training images. $E(H_{k,j})$ represents the mean and is computed using Equation (2) shown below:

$$E(H_{k,j}) = \frac{1}{M}\sum_{i=1}^{M} H^i_{k,j} \quad (2)$$

$$k = 1, 2, \ldots N;$$

$\sigma_{k,j}$ represents the variance and is computed using Equation (3) shown below:

$$\sigma_{k,j} = \frac{1}{M}\sum_{i=1}^{M}(H^i_{k,j} - E(H_{k,j}))^2 \quad (3)$$

$$k = 1, 2, \ldots N;$$

The cross-correlation values that are computed between each pair of projected value sets corresponding to candidate matrices are then compared to a threshold value cross-correlation value and a determination is made whether all of the cross-correlation values are below the cross-correlation threshold value (Step 208). If all of the cross-correlation values are below the cross-correlation threshold value then the current set of candidate matrices is selected as the plurality of projection matrices (Step 210). However, if at least one of the cross-correlation values are not below the cross-correlation threshold value then at least one of the plurality of the candidate matrices are replaced with a different candidate matrix (Step 212). Replacing at least one of the candidate matrices involves discarding the at least one candidate matrix and generating candidate matrices to replace the discarded candidate matrices.

The at least one candidate matrix that is to be discarded is selected such that the cross-correlation values between the remaining candidate matrices based on corresponding projected values are all below the cross-correlation threshold value. For example, in a very simple example involving only three candidate matrices, suppose that the cross-correlation values between the first candidate matrix and the second candidate matrix, and between the first candidate matrix and the third candidate matrix are below the cross-correlation threshold value. However, the cross-correlation threshold value between the second candidate matrix and the third candidate matrix is above the cross-correlation threshold value. In this example, either the second or the third candidate matrix may be discarded. If the second candidate matrix is discarded, the remaining candidate matrices, i.e., the first candidate matrix and the third candidate matrix have a cross-correlation value below the cross-correlation threshold value. If the third candidate matrix is discarded, the remaining candidate matrices, i.e., the first candidate matrix and the second candidate matrix have a cross-correlation value below the cross-correlation threshold value. Furthermore, in this example, the second candidate and the third candidate matrix also may both be discarded, however, this is not necessary as discarding one of the two candidate matrices results in the remaining candidate matrices with cross-correlation values below the cross-correlation threshold value.

Generating candidate matrices to replace the at least one discarded matrix may simply involve generating a new random candidate matrix. Generating candidate matrices to replace the at least one discarded matrix may also be based on an algorithm which accepts the discarded candidate matrix as input. For example, the replacement candidate matrix may be generated to be orthogonal or otherwise different than the discarded candidate matrix. Thereafter, the feature matrices are projected onto the replacement candidate matrices to obtain a set of projected values for each of the replacement candidate matrices, so that the process can be repeated in the next iteration (Step 214). In an embodiment, cross-correlation values between candidate matrices that have already been computed from previous iterations don't have to be re-computed.

In an embodiment, the cross-correlation method described above may be modified to remove any iterations. A large number of candidate matrices may generated up front and after determining the cross-correlation values, the candidate matrices with the lowest cross-correlation values may be selected as the projection matrices. For example, if ten projection matrices are to be selected, twenty candidate matrices may be generated first and of the twenty candidate matrices, ten may be selected as projection matrices based on lowest cross-correlation values between their corresponding projected values. Alternatively, a subgroup of the twenty candidate matrices may be selected based on whether the cross-correlation values for projected values corresponding to the subgroup are below the cross-correlation threshold value.

In an embodiment, a combination of the two methods described above may be used, where an iteration has more than the needed number of candidate matrices and where some of the candidate matrices may be discarded with replacements where other candidate matrices may be discarded without replacements.

In an embodiment, the cross-correlation between projected values of the projection matrices may be used to determine a uniqueness of the projection matrices. For example, a total of all the cross-correlation values for a projection matrix in comparison to the other projection matrices may be computed. If the total of the cross-correlation values for that projection matrix is lowest, then the projection matrix is the most unique (or significant) of all the projection matrices. In an embodiment, the uniqueness of the projection matrix is used to determine the number of signature bits to be generated from that projection matrix when a feature matrix for an image is being projected onto the selected set of projection matrices. Accordingly, the more unique the projection matrix (i.e., the lower the cross-correlation of corresponding projected values based on the training set, in comparison to other sets of projection values), the greater the number of signature bits may be generated from that projection matrix.

In an embodiment, projection matrices are selected from the candidate matrices such that the projected values, which are obtained by projection of a feature matrices based on one or more training images onto the projection matrices, threshold approximately evenly between signature bits (e.g., zero and one).

2.3 Generation of Projection Matrices Using Matrix Factorization

Figure 3:
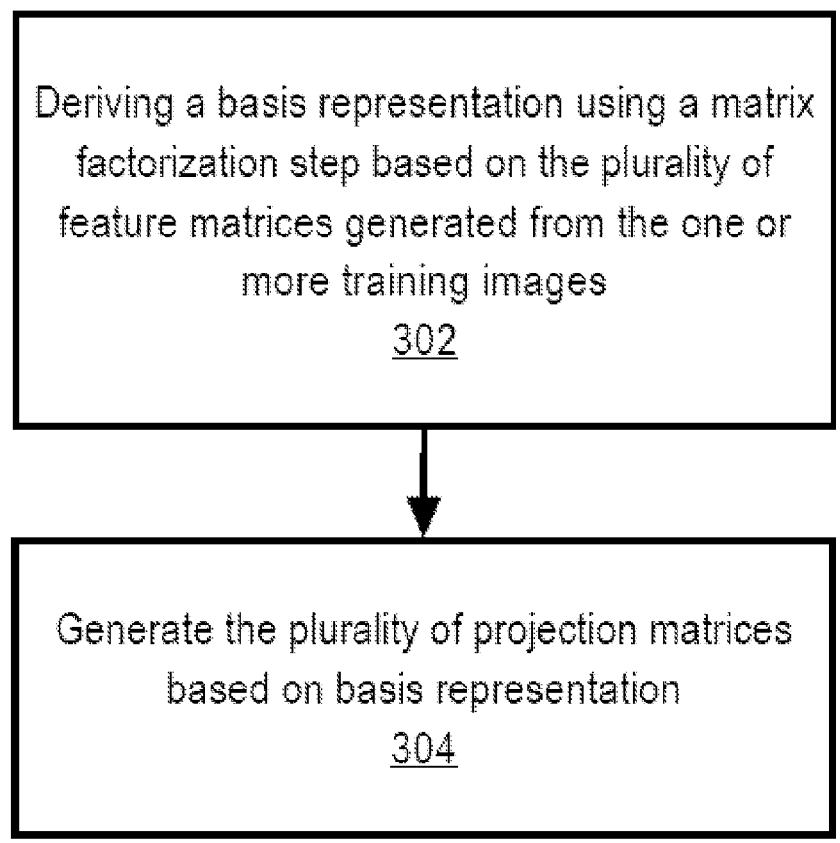

FIG. 3 depicts a training process for generation of projection matrices using matrix factorization. This method involves deriving a basis representation from a plurality of feature matrices, generated from one or more training images, using matrix factorization (Step 302). Matrix factorization can be applied directly to the plurality of feature matrices, may be applied to a covariance matrix of the plurality of feature matrices, or may be applied to any other data set derived from the plurality of feature matrices. The basis representation derived from the plurality of feature matrices or the covariance matrix of the plurality of feature matrices generally includes basis vectors and a linear combination (e.g., weights) of the basis vectors that can be used to compute the plurality of feature matrices or the covariance matrix. The plurality of the projection matrices may then be generated based on the basis representation (Step 304). For example, the basis vectors of the basis representation may be used as the projection matrices.

In one or more possible embodiments, the matrix factorization method applied directly to the plurality of feature matrices may involve non-negative matrix factorization (NMF) or singular value decomposition (SVD). In an example involving an application of NMF to the plurality of feature matrices, a basis representation including NMF basis vectors and the linear combination of the NMF basis vectors may be obtained, such that, the NMF basis vectors and the linear combination of the NMF basis vectors can be used to re-generate the plurality of feature matrices.

In one or more possible embodiments, the matrix factorization method applied to covariance matrix of the plurality of feature matrices may involve application of SVD or principal component analysis (PCA). For example, deriving the basis representation may include computing a covariance matrix $C^{feat}$ from the feature matrices based on the one or more training images. Thereafter, PCA is applied to the covariance matrix $C^{feat}$ to generate N eigenvectors or matrices $\Phi_1$, $\Phi_2, \ldots \Phi_N$ such that the cross-correlation between any two projected values ($C_{svd}(k,l)$) is equal to zero. Here $C_{svd}(k,l)$ represents the cross-correlation between $H^{svd}_k$ (projection of Q onto $\Phi_k$) and $H^{svd}_1$ (projection of Q onto $\Phi_1$).

As described in Step 104 above, a plurality of feature matrices are generated from one or more training images. The feature matrices are referred to as $Q^i$ (i=1, 2 . . . M), where the dimensions of each feature matrix are R×R. A covariance matrix $C^{feat}$ of dimension R*R is computed from $Q^1, Q^2, \ldots Q^M$. The covariance matrix may be calculated using Equation (4) shown below:

$$C^{fest}(k, l) = \frac{1}{M}\sum_{i=1}^{M}(Q_k^i - E(Q_k))(Q_l^i - E(Q_l)) \quad (4)$$

$$k = 1, 2, \ldots R; l = 1, 2, \ldots R$$

$E(Q_k)$ represents the mean and is computed using Equation (5) shown below:

$$E(Q_k) = \frac{1}{M}\sum_{i=1}^{M}Q_k^i \quad (5)$$

$$k = 1, 2, \ldots R;$$

In an embodiment, eigenvectors may then be calculated based on the covariance matrix $C^{feat}$ using Equation (6) shown below:

$$V^{-1}C^{feat}V = D \quad (6)$$

In Equation (6), D is a diagonal matrix with eigenvalues $E_1$, $E_2 \ldots E_R$) in its main diagonal and zero elsewhere. The covariance matrix $C^{feat}$ is factored as $VDV^{-1}$. The equation (6) may then be solved to determine the columns of V. The columns of V, which is of dimension R×R, are the eigenvectors of the covariance matrix $C^{feat}$ and are represented as $\Phi_1$, $\Phi_2$, $\Phi_R$. Thereafter, each projection matrix may is generated based on each of the eigenvectors $\Phi_1$, $\Phi_2$, $\Phi_R$.

In an embodiment, in order to generate a fingerprint or a fingerprint codeword for an image, any feature matrix of size 1×R based on the image is projected onto the first N eigenvectors $\Phi_1$, $\Phi_2$, $\ldots \Phi_N$, where each eigenvector has R elements, to obtain projected values $H^{svd}_1$, $H^{svd}_2$, $\ldots H^{svd}_N$ respectively, where $H^{svd}_k$ is the projection of Q onto $\Phi_k$. Furthermore, the cross-correlation between any two projected values ($C_{svd}(k,l)$) is equal to zero as the eigenvectors. The projected values are then quantized to derive signature bits for a fingerprint or a fingerprint codeword used for indexing the fingerprint or media file.

The projected values $H^{svd}_1$, $H^{svd}_2$, $\ldots H^{svd}_N$, which are obtained from projecting a feature matrix Q based on an image onto $\Phi_1$, $\Phi_2$, $\ldots \Phi_N$, have an inherent order of significance that corresponds to the significance of the basis functions $\Phi_1$, $\Phi_2$, $\ldots \Phi_N$ ($\Phi_1$ more significant than $\Phi_2$, $\Phi_2$ more significant than $\Phi_3$ ... so on). For instance, in order to obtain the best rank-2 approximation of the training data set $Q^1$, $Q^2$, $\ldots Q^M$, the first two basis vector projections are used. Accordingly, a varying number of signature bits may derived from each of the projected values $H^{svd}_1$, $H^{svd}_2$, $H^{svd}_N$. In an embodiment, a larger number of signature bits are derived from $H^{svd}_1$ than from $H^{svd}_N$ as $H^{svd}_1$ is more significant.

Although the example embodiment above describes the use of a covariance matrix generated from feature matrices based on a training set of images, embodiments of the invention are applicable to any basis representation of the feature matrices. For example, any basis functions (e.g., non-negative matrix factorization) resulting in a basis representation when applied to the feature matrices may be used.

Example embodiments of the present invention are described above in relation to specified media fingerprints that generally correspond to media content. Any specified media described above is selected as an example medium in the description above merely for simplicity and unity and, except as expressly stated to the contrary, should not be construed as limiting an embodiment to a particular medium. Embodiments of the present invention are well suited to function with video, audio, and graphical (e.g., still, text based,) media.

For instance, embodiments are well suited to derive acoustic signatures and composite acoustic fingerprints (which may also be referred to as "audio" fingerprints, e.g., synonymously, interchangeably) thereof from images associated with audio media such as sound, music and speech recordings. The audio media may be associated with video media, such as a recorded soundtrack that may be encoded with video media, and/or with another multimedia format.

3.0 IMPLEMENTATION MECHANISMS

Hardware Overview

Embodiments of the present invention, may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components.

Figure 4:
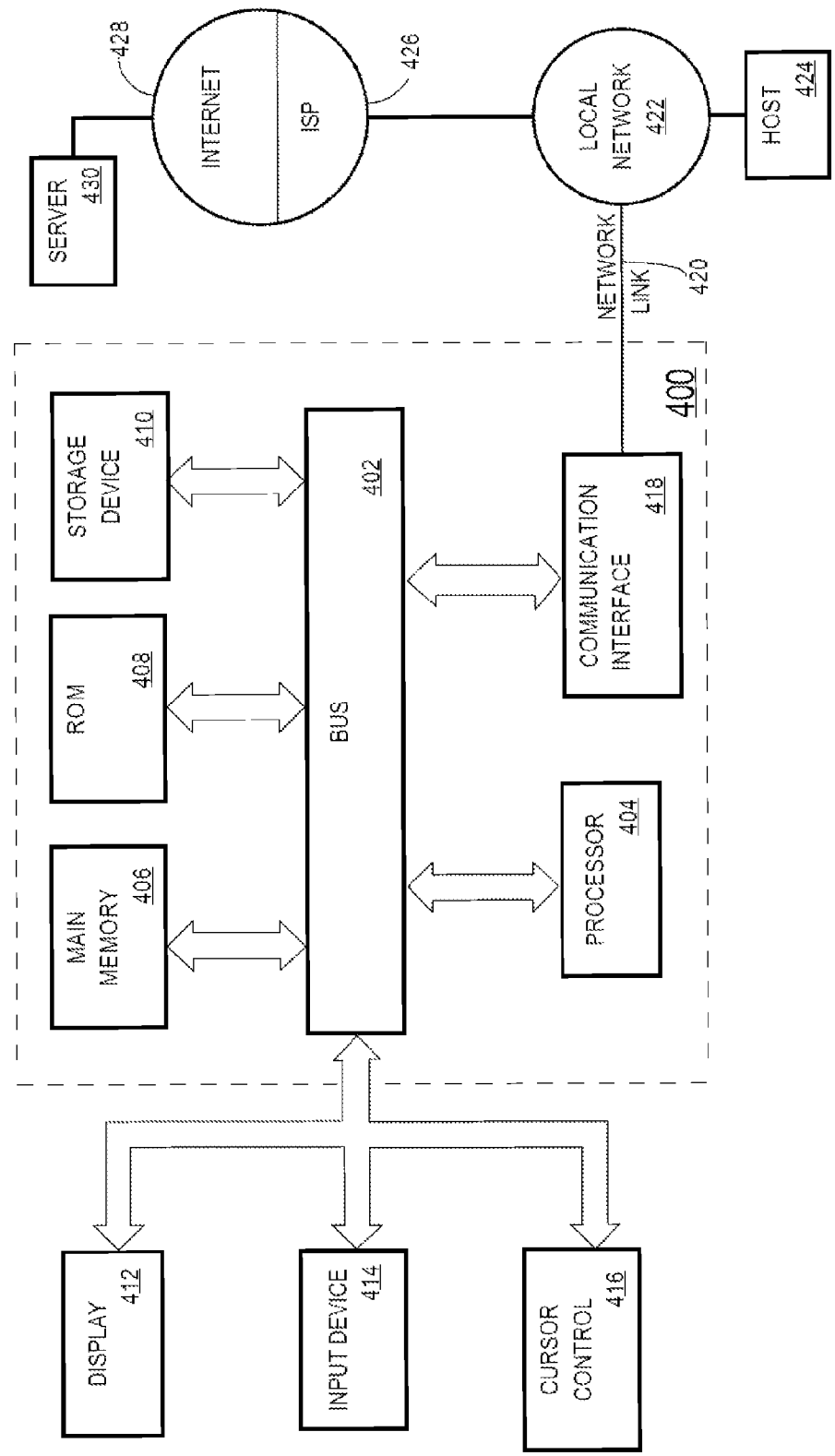
FIG. 4 depicts an example computer system platform, with which an embodiment of the present invention may be implemented.

FIG. 4 depicts an example computer system platform 400, with which an embodiment of the present invention may be implemented. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), liquid crystal display (LCD), plasma screen display, or the like, for displaying information to a computer user. An input device 414, including alphanumeric (or non-alphabet based writing systems and/or non-Arabic number based) and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), which allows the device to specify positions in a plane.

Embodiments may relate to the use of computer system 400 for implementing techniques described herein. According to an embodiment of the invention, such techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any storage medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave and infrared and other optical data communications. Such media are tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, other legacy media or any other physical medium with patterns of holes or darkened spots, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a digital subscriber line (DSL) or cable modem (traditionally modulator/demodulator) to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Figure 5:
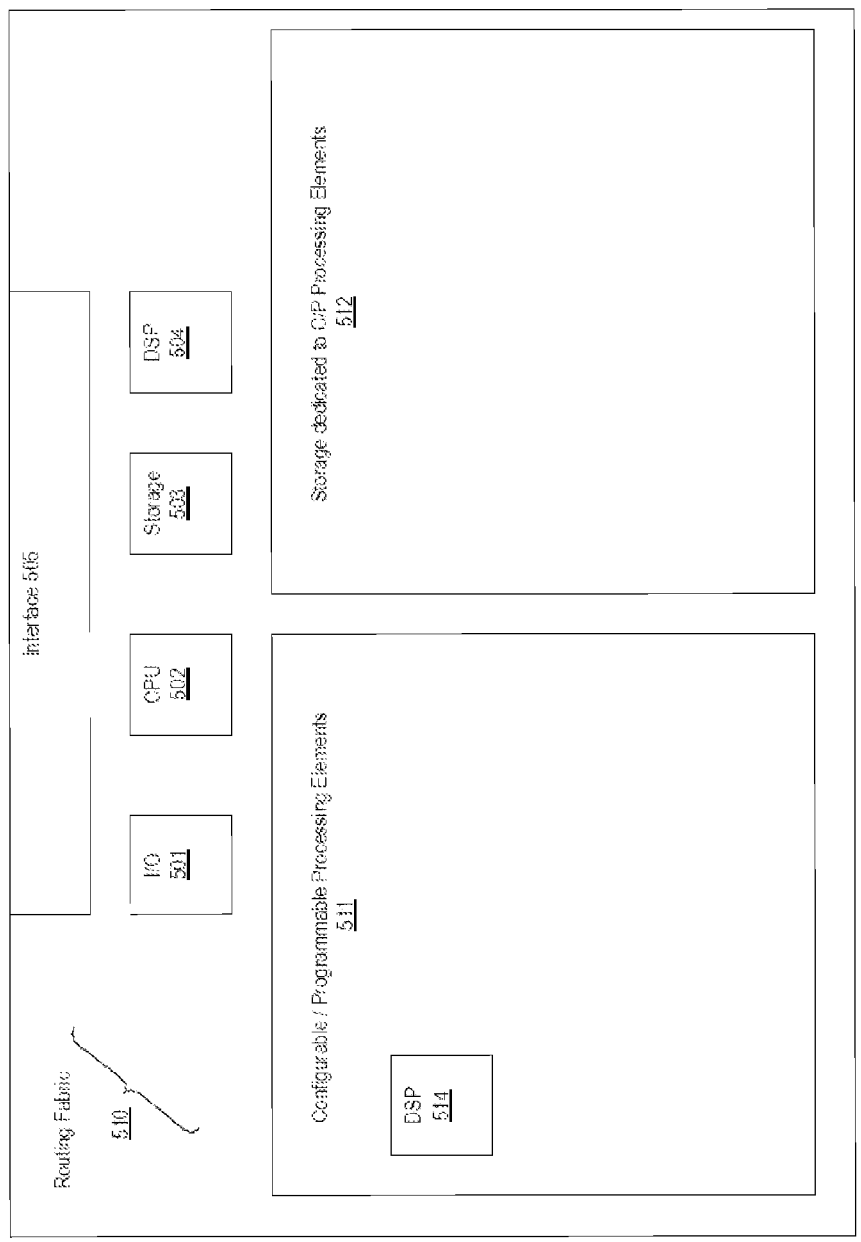
FIG. 5 depicts an example integrated circuit device, with which an embodiment of the present invention may be implemented.

FIG. 5 depicts an example IC device 500, with which an embodiment of the present invention may be implemented. IC device 500 may have an input/output (I/O) feature 501. I/O feature 501 receives input signals and routes them via routing fabric 510 to a central processing unit (CPU) 502, which functions with storage 503. I/O feature 501 also receives output signals from other component features of IC device 500 and may control a part of the signal flow over routing fabric 510. A digital signal processing (DSP) feature performs at least function relating to digital signal processing. An interface 508 accesses external signals and routes them to I/O feature 501, and allows IC device 500 to export signals. Routing fabric 510 routes signals and power between the various component features of IC device 500.

Configurable and/or programmable processing elements (CPPE) 511, such as arrays of logic gates may perform dedicated functions of IC device 500, which in an embodiment may relate to deriving and processing media fingerprints that generally correspond to media content. Storage 512 dedicates sufficient memory cells for CPPE 511 to function efficiently. CPPE may include one or more dedicated DSP features 514.

An embodiment of the present invention may relate to one or more of the following enumerated example embodiments.

1. A computer-implemented method comprising:
  generating a plurality of projection matrices in a training process, wherein the training process comprises:
    generating a plurality of feature matrices based on one or more training images;
    projecting the plurality of feature matrices onto a plurality of candidate matrices to obtain a plurality of projected values for each of the plurality of candidate matrices; and
    selecting a subgroup of the plurality of candidate matrices as the projection matrices based on cross-correlation values between the plurality of projected values for each of the projection matrices; and
  deriving a fingerprint codeword for one or more images, wherein deriving the fingerprint codeword for the one or more images comprises projecting a feature matrix based on the one or more images onto the plurality of projection matrices generated in the training process.

2. The method as recited in Enumerated Example Embodiment 1, wherein selecting the projection matrices is responsive to determining that the cross-correlation values between the plurality of projected values for each of the projection matrices are below a cross-correlation threshold value.

3. The method as recited in Enumerated Example Embodiment 2, wherein projecting the plurality of feature matrices onto the plurality of candidate matrices to obtain a plurality of projected values for each of the plurality of candidate matrices, comprises:
   iteratively generating the plurality of candidate matrices until selection of the projection matrices is completed.

4. The method as recited in Enumerated Example Embodiment 3, wherein iteratively generating the plurality of candidate matrices until selection of the projection matrices is completed comprises:
   determining a cross-correlation between the projected values of a current set of the plurality of candidate matrices;
   replacing at least one candidate matrix in the current set of the plurality of candidate matrices with one or more new candidate matrices in each iteration until the current set of the plurality of candidate matrices is identified such that the cross-correlation values between the projected values for each of the current set of the candidate matrices are all below the cross-correlation threshold value; and
   responsive to identifying the current set of the plurality of candidate matrices such that the cross-correlation values between the projected values for each of the current of the candidate matrices are all below the cross-correlation threshold value, selecting the current set of the plurality of candidate matrices as the plurality of projection matrices.

5. The method as recited in Enumerated Example Embodiment 3, wherein iteratively generating the plurality of candidate matrices until selection of the projection matrices is completed comprises:
   projecting the plurality of feature matrices onto a first candidate matrix of the plurality of candidate matrices to obtain a first plurality of projected values for the first candidate matrix;
   determining cross-correlation values between the first plurality of projected values and the projected values of the remaining candidate matrices that have previously been generated, wherein at least one cross-correlation value is above the cross-correlation threshold;
   responsive to the at least one-correlation value being above the cross-correlation threshold, generating a second candidate matrix of the plurality of candidate matrices; projecting the plurality of feature matrices onto the second candidate matrix of the plurality of candidate matrices to obtain a second plurality of projected values for the second candidate matrix;
   determining cross-correlation values between the second plurality of projected values and the projected values of the remaining candidate matrices that have previously been generated, except the first plurality of projected values, wherein the cross-correlation values between the second plurality of projected values and the projected values of the remaining candidate matrices are below the cross-correlation threshold; and
   responsive to determining cross-correlation values, between the second plurality of projected values and the projected values of the remaining candidate matrices are below the cross-correlation threshold, selecting the second candidate matrix as one of the projection matrices.

6. The method as recited in Enumerated Example Embodiment 5, further comprising generating the second candidate matrix based on the first candidate matrix.

7. The method as recited in Enumerated Example Embodiment 6, wherein generating the second candidate matrix based on the first candidate matrix comprises generating the second candidate matrix orthogonal to the first candidate matrix.

8. The method as recited in Enumerated Example Embodiment 1, wherein selecting the projection matrices based on a cross-correlation between the projected values for each of projection matrices, comprises:
   generating a cross-correlation matrix comprising a plurality of cross-correlation values for each candidate matrix, wherein the plurality of cross-correlation values for a candidate matrix represent cross-correlation between said candidate matrix and the remaining candidate matrices of the plurality of candidate matrices; and
   selecting said candidate matrix as a projection matrix of the plurality of projection matrices if each of the plurality of cross-correlation values for said candidate matrix are below the cross-correlation threshold.

9. The method as recited in Enumerated Example Embodiment 1, wherein projecting the plurality of feature matrices onto one of the plurality of candidate matrices to obtain a plurality of projected values for each of the plurality of candidate matrices, comprises:
   computing a Hadamard product of each of the plurality of feature matrices with each of the plurality of candidate matrices to obtain a resulting matrix; and summing up elements in the resulting matrix.

10. The method as recited in Enumerated Example Embodiment 1, wherein selecting the projection matrices is further based on selecting projection matrices wherein the projected values of the projection matrices threshold to zero and one, evenly.

11. The method as recited in Enumerated Example Embodiment 1, wherein deriving the fingerprint codeword for the one or more images further comprises:
   projecting the feature matrix based on the one or more images onto the projection matrices to generate a plurality of projected values associated with the one or more images;
   computing a plurality of signature bits based on the plurality of projected values; and
   determining the fingerprint codeword for the one or more images based on the plurality of signature bits.

12. The method as recited in Enumerated Example Embodiment 11, wherein computing the plurality of signature bits based on the plurality of projected values comprises deriving a varying number of signature bits based on each of the projection matrices of the plurality of projected values based on a uniqueness of each projection matrix.

13. The method as recited in Enumerated Example Embodiment 12, wherein the uniqueness of each projection matrix is determined by:
   projecting the plurality of feature matrices, which are based on the one or more training images, on the projection matrix to obtain a corresponding set of projected values;
   comparing the set of projected values corresponding to the projection matrix to each set of projected values corresponding to the remaining projection matrices of the plurality of projection matrices to determine to obtain cross-correlation values for the projection matrix; and
   ranking the uniqueness of the projection matrix based on an inverse relationship to the cross-correlation values for the projection matrix.

14. The method as recited in Enumerated Example Embodiment 1, wherein the one or more images comprise spectrograms, video frames, or still images.

15. A computer-implemented method comprising:
   generating a plurality of projection matrices in a training process, wherein the training process comprises:
      generating a plurality of feature matrices based on one or more training images;
      computing a basis representation based on the plurality of feature matrices; and
      generating the plurality of projection matrices based on the basis representation; and
   deriving a fingerprint codeword for one or more images, wherein deriving the fingerprint codeword for the one or more images comprises projecting a feature matrix based on the one or more images onto the plurality of projection matrices generated in the training process.

16. The method as recited in Enumerated Example Embodiment 15, wherein the basis representation is derived using a matrix factorization step based on the plurality of feature matrices.

17. The method as recited in Enumerated Example Embodiment 16, wherein the matrix factorization step comprises one or more of:
   applying non-negative matrix factorization (NMF) to the plurality of feature matrices; or
   applying singular value decomposition (SVD) to the plurality of feature matrices.

18. The method as recited in Enumerated Example Embodiment 16, wherein the basis representation is derived from a covariance matrix based on the plurality of feature matrices.

19. The method as recited in Enumerated Example Embodiment 18, wherein the matrix factorization step comprises applying principal component analysis (PCA) to the covariance matrix of the plurality of feature matrices.

20. The method as recited in Enumerated Example Embodiment 15, wherein the basis representation comprises a plurality of basis vectors and a linear combination of the plurality of basis vectors from which the plurality of feature matrices or a covariance matrix of the plurality of feature matrices may be computed.

21. The method as recited in Enumerated Example Embodiment 20, wherein generating the plurality of projection matrices based on the basis representation comprises selecting one or more basis vectors of the plurality of basis vectors as one or more projection matrices of the plurality of projection matrices.

22. The method as recited in Enumerated Example Embodiment 21, wherein deriving the fingerprint codeword for the one or more images comprises deriving a varying number of signature bits based on each of the projection matrices and generating the fingerprint codeword based on the signature bits.

23. The method as recited in Enumerated Example Embodiment 22, wherein deriving a varying number of signature bits based on each of the projection matrices comprises selecting a number of signature bits to derive from each of the projection matrices based on the significance of that projection matrix.

24. The method as recited in Enumerated Example Embodiment 23, wherein the significance of a subgroup of the projection matrices is determined based on the approximation of the plurality of feature matrices that can be obtained using the subgroup of projection matrices and a linear combination of the subgroup of projection matrices.

25. The method as recited in Enumerated Example Embodiment 15, wherein in a cross-correlation value, between projected values obtained by projecting the plurality of feature matrices onto the projection matrices, comprises zero.

26. A computer-implemented method comprising:
   generating a plurality of feature matrices based on one or more training images;
   generating a plurality of projection matrices in a training process based on the plurality of feature matrices;
   projecting a feature matrix based on one or more images onto the plurality of projected matrices, obtained in the training process, to generate a plurality of projected values associated with the one or more images; and
   deriving a fingerprint codeword for the one or more images based on the plurality of projected values.

27. A system, comprising:
   means for performing, executing or controlling a process as recited in one or more of Enumerated Example Embodiments 1-26.

28. An apparatus, comprising:
   at least one processor; and
   a computer readable storage medium that comprises encoded instructions, which when executed by the at least one processor, cause or control a process as recited in one or more of Enumerated Example Embodiments 1-26.

29. A use for a computer system, comprising performing, executing or controlling a process as recited in one or more of Enumerated Example Embodiments 1-26.

30. A computer readable storage medium having encoded instructions which, when executed by one or more processors, cause the one or more processors to:
   perform, execute or control a process as recited in one or more of Enumerated Example Embodiments 1-26;
   control, program or configure one or more of:
      a system as recited in Enumerated Example Embodiment 27; or
      an apparatus as recited in Enumerated Example Embodiment 28; or
   control or program the computer system use as recited in Enumerated Example Embodiment 29.

4.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A computer-implemented method comprising:
   generating a plurality of projection matrices in a training process, wherein the training process comprises:
      generating a plurality of feature matrices based on one or more training images;
      projecting the plurality of feature matrices onto a plurality of candidate matrices to obtain a plurality of projected values for each of the plurality of candidate matrices; and
      selecting a subgroup of the plurality of candidate matrices as the projection matrices based on cross-correla- tion values between the plurality of projected values for each of the projection matrices; and deriving a fingerprint codeword for one or more images, wherein deriving the fingerprint codeword for the one or more images comprises projecting a feature matrix based on the one or more images onto the plurality of projection matrices generated in the training process.

2. The method as recited in claim 1, wherein selecting the projection matrices is responsive to determining that the cross-correlation values between the plurality of projected values for each of the projection matrices are below a cross-correlation threshold value.

3. The method as recited in claim 2, wherein projecting the plurality of feature matrices onto the plurality of candidate matrices to obtain a plurality of projected values for each of the plurality of candidate matrices, comprises:

iteratively generating the plurality of candidate matrices until selection of the projection matrices is completed.

4. The method as recited in claim 3, wherein iteratively generating the plurality of candidate matrices until selection of the projection matrices is completed comprises:

determining a cross-correlation between the projected values of a current set of the plurality of candidate matrices;

replacing at least one candidate matrix in the current set of the plurality of candidate matrices with one or more new candidate matrices in each iteration until the current set of the plurality of candidate matrices is identified such that the cross-correlation values between the projected values for each of the current set of the candidate matrices are all below the cross-correlation threshold value; and responsive to identifying the current set of the plurality of candidate matrices such that the cross-correlation values between the projected values for each of the current of the candidate matrices are all below the cross-correlation threshold value, selecting the current set of the plurality of candidate matrices as the plurality of projection matrices.

5. The method as recited in claim 3, wherein iteratively generating the plurality of candidate matrices until selection of the projection matrices is completed comprises:

projecting the plurality of feature matrices onto a first candidate matrix of the plurality of candidate matrices to obtain a first plurality of projected values for the first candidate matrix;

determining cross-correlation values between the first plurality of projected values and the projected values of the remaining candidate matrices that have previously been generated, wherein at least one cross-correlation value is above the cross-correlation threshold;

responsive to the at least one-correlation value being above the cross-correlation threshold, generating a second candidate matrix of the plurality of candidate matrices;

projecting the plurality of feature matrices onto the second candidate matrix of the plurality of candidate matrices to obtain a second plurality of projected values for the second candidate matrix;

determining cross-correlation values between the second plurality of projected values and the projected values of the remaining candidate matrices that have previously been generated, except the first plurality of projected values, wherein the cross-correlation values between the second plurality of projected values and the projected values of the remaining candidate matrices are below the cross-correlation threshold; and responsive to determining cross-correlation values, between the second plurality of projected values and the projected values of the remaining candidate matrices are below the cross-correlation threshold, selecting the second candidate matrix as one of the projection matrices.

6. The method as recited in claim 5, further comprising generating the second candidate matrix based on the first candidate matrix.

7. The method as recited in claim 6, wherein generating the second candidate matrix based on the first candidate matrix comprises generating the second candidate matrix orthogonal to the first candidate matrix.

8. The method as recited in claim 1, wherein selecting the projection matrices based on a cross-correlation between the projected values for each of projection matrices, comprises:

generating a cross-correlation matrix comprising a plurality of cross-correlation values for each candidate matrix, wherein the plurality of cross-correlation values for a candidate matrix represent cross-correlation between said candidate matrix and the remaining candidate matrices of the plurality of candidate matrices; and selecting said candidate matrix as a projection matrix of the plurality of projection matrices if each of the plurality of cross-correlation values for said candidate matrix are below the cross-correlation threshold.

9. The method as recited in claim 1, wherein projecting the plurality of feature matrices onto one of the plurality of candidate matrices to obtain a plurality of projected values for each of the plurality of candidate matrices, comprises:

computing a Hadamard product of each of the plurality of feature matrices with each of the plurality of candidate matrices to obtain a resulting matrix; and summing up elements in the resulting matrix.

10. The method as recited in claim 1, wherein selecting the projection matrices is further based on selecting projection matrices wherein the projected values of the projection matrices threshold to zero and one, evenly.

11. The method as recited in claim 1, wherein deriving the fingerprint codeword for the one or more images further comprises:

projecting the feature matrix based on the one or more images onto the projection matrices to generate a plurality of projected values associated with the one or more images;

computing a plurality of signature bits based on the plurality of projected values; and determining the fingerprint codeword for the one or more images based on the plurality of signature bits.

12. The method as recited in claim 11, wherein computing the plurality of signature bits based on the plurality of projected values comprises deriving a varying number of signature bits based on each of the projection matrices of the plurality of projected values based on a uniqueness of each projection matrix.

13. The method as recited in claim 12, wherein the uniqueness of each projection matrix is determined by:

projecting the plurality of feature matrices, which are based on the one or more training images, on the projection matrix to obtain a corresponding set of projected values;

comparing the set of projected values corresponding to the projection matrix to each set of projected values corresponding to the remaining projection matrices of the plurality of projection matrices to determine to obtain cross-correlation values for the projection matrix; and ranking the uniqueness of the projection matrix based on an inverse relationship to the cross-correlation values for the projection matrix.

14. The method as recited in claim 1, wherein the one or more images comprise spectrograms, video frames, or still images.

* * * * *